United States Patent
Friio et al.

(10) Patent No.: US 10,554,595 B2
(45) Date of Patent: Feb. 4, 2020

(54) CONTACT CENTER SYSTEM AND METHOD FOR ADVANCED OUTBOUND COMMUNICATIONS TO A CONTACT GROUP

(71) Applicant: Genesys Telecommunications Laboratories, Inc., Daly City, CA (US)

(72) Inventors: Andrea Friio, Lafayette, CA (US); Bruce Eidsvik, Lafayette, CA (US)

(*) Notice: Subject to any disclaimer, the term of this patent is extended or adjusted under 35 U.S.C. 154(b) by 185 days.

(21) Appl. No.: 15/717,509

(22) Filed: Sep. 27, 2017

(65) Prior Publication Data
US 2018/0337875 A1 Nov. 22, 2018

Related U.S. Application Data

(60) Provisional application No. 62/509,692, filed on May 22, 2017.

(51) Int. Cl.
| | |
|---|---|
| H04L 12/58 | (2006.01) |
| H04L 29/08 | (2006.01) |
| G06Q 50/14 | (2012.01) |
| G06Q 10/10 | (2012.01) |
| G06N 5/04 | (2006.01) |

(52) U.S. Cl.
CPC ............ *H04L 51/046* (2013.01); *G06N 5/04* (2013.01); *G06Q 10/1093* (2013.01); *G06Q 50/14* (2013.01); *H04L 67/1097* (2013.01); *H04L 67/141* (2013.01)

(58) Field of Classification Search
CPC ...... G06N 5/04; G06Q 10/1093; G06Q 50/14; H04L 51/046
See application file for complete search history.

(56) References Cited

U.S. PATENT DOCUMENTS

2002/0198747 A1* 12/2002 Boyer ................... G06Q 10/02
  705/5
2004/0019606 A1* 1/2004 Ackerman ............ G06Q 10/02
  (Continued)

FOREIGN PATENT DOCUMENTS

| JP | 200544173 A | 2/2005 |
|---|---|---|
| WO | 03042883 A1 | 5/2003 |

OTHER PUBLICATIONS

International Search Report and Written Opinion for Application No. PCT/US2018/033754, dated Sep. 13, 2018, 10 pages.

*Primary Examiner* — Mohamed A. Wasel

(57) ABSTRACT

A method of establishing communication across contact center systems of unaffiliated entities includes receiving a first signal from a first server of a first contact center system, the first signal being indicative of an event associated with a first entity of the unaffiliated entities, identifying a user based on an identifier embedded within the first signal, identifying one or more second entities from among the unaffiliated entities, wherein the second entities are identified as being trusted by the user, predicting impact of the event on the one or more second entities, identifying a particular entity from among the one or more second entities predicted to be impacted by the event, and generating a second signal for transmission to a second server of a second contact center system associated with the identified particular entity, the second signal including data corresponding to the user and the event.

17 Claims, 12 Drawing Sheets

(56) References Cited

U.S. PATENT DOCUMENTS

| | | | |
|---|---|---|---|
| 2006/0046740 A1* | 3/2006 | Johnson | H04M 3/4878 |
| | | | 455/456.1 |
| 2006/0241983 A1 | 10/2006 | Viale et al. | |
| 2008/0004917 A1 | 1/2008 | Mortimore | |
| 2009/0210262 A1 | 8/2009 | Rines et al. | |
| 2014/0278605 A1* | 9/2014 | Borucki | G06Q 30/0617 |
| | | | 705/5 |
| 2014/0282003 A1* | 9/2014 | Gruber | G06F 3/165 |
| | | | 715/727 |
| 2015/0006460 A1* | 1/2015 | Skiba | G06N 5/022 |
| | | | 706/50 |
| 2015/0371157 A1* | 12/2015 | Jaffe | G06Q 10/025 |
| | | | 705/6 |

* cited by examiner

FIG. 5B

CONTACT CENTER SYSTEM AND METHOD FOR ADVANCED OUTBOUND COMMUNICATIONS TO A CONTACT GROUP

CROSS-REFERENCE TO RELATED APPLICATION(S)

This application claims priority to, and the benefit of, U.S. Provisional Application No. 62/509,692 ("Notification System and Method Across Trusted Brands"), filed on May 22, 2017, the entire content of which is incorporated herein by reference.

FIELD

Aspects of the invention relate to the field of communication management between contact centers.

BACKGROUND

When planning a journey, an individual may make arrangements with a number of businesses or services within the travel industry. For example, an individual may book an airline ticket, make hotel and car rental reservations, and the like. Oftentimes, such related businesses, which operate within the same broad industry, do not share customer activity information due to, for example, privacy and security concerns, business competition, and the like. As a result, when the individual's travel plans change, s/he generally has to separately contact each business or service (e.g., the airline, hotel, car rental company) to make the appropriate change to the reservation or arrangement. This may be a cumbersome and time consuming process for the individual to undertake, and a failure to contact even one of the businesses or services may result in great inconvenience and cost to the individual, and may even lead to a loss of profits for the uninformed business. For instance, if a planned journey is postponed, but the individual forgets to inform the hotel of the later arrival date, the individual may arrive at the destination only to find that no rooms are available at the hotel or that the cost of staying at the hotel has sharply increased.

Thus, what is desired is a backend solution for automatically communicating among businesses/services when events are detected at a particular business that reduces or minimizes customer involvement while also respecting the customer's privacy rights and satisfying business competition concerns.

The above information disclosed in this Background section is only for enhancement of understanding of the background of the invention, and therefore it may contain information that does not form the prior art that is already known to a person of ordinary skill in the art.

SUMMARY

Aspects of embodiments of the invention are directed to a cross-entity communication system for enabling communication of user activity information between entities (e.g., corporate entities) trusted by a user. In some embodiments, the cross-entity communication system enables a user to indicate a group of unaffiliated entities, which the user trusts for sharing information about the user's commercial interactions with entities within the group, in a limited but effective way, in order to improve the user's overall experience in interacting with the group. A user may indicate the group of trusted entities within a page of an entity's website, and the user's preferences may be communicated to the cross-entity communication system via a contact center of the entity. Every time a user engages in one of a predefined list of interactions with an entity, a contact center of the entity notifies the cross-entity communication system of the interaction. If the cross-entity communication system determines that the user interaction does not pertain to any open service event for the user and notifying entity pair, the cross-entity communication system opens a new service record for the user-entity pair. Otherwise, the activity may be added to an event log of an existing open service event for the user-entity pair. The cross-entity communication system then utilizes artificial intelligence to determine which of the other trusted entities, which has an open service record with the user, is impacted by the user interaction, and alerts those entities of the event/interaction. In so doing, each alert, which may be specifically tailored for the recipient entity, may reveal the identity of the user, and only enough information about the event to enable the recipient entity to provide appropriate service to the user. For example, the customized reporting signal may not reveal information relating to the entity that was the source of the event notification, as well as other non-critical information. The alerted entities may then decide whether or not to further engage the user based on the received alert.

According to some embodiments of the invention, there is provided a method of establishing communication across contact center systems of unaffiliated entities based on machine learning, the method including: receiving, by the processor, a first signal from a first server of a first one of the contact center systems, the first signal being indicative of an event associated with a first entity of the unaffiliated entities; identifying, by the processor, a user based on an identifier embedded within the first signal; identifying, by the processor, one or more second entities from among the unaffiliated entities, wherein the second entities are identified as being trusted by the user; predicting, by the processor, impact of the event on the one or more second entities; identifying, by the processor, a particular entity from among the one or more second entities predicted to be impacted by the event; and generating, by the processor, a second signal for transmission to a second server of a second one of the contact center systems associated with the identified particular entity, the second signal including data corresponding to the user and the event.

In some embodiments, the event is associated with a user interaction with the first entity.

In some embodiments, the method further includes: identifying the event as an open event, an update event, or a close event; in response to identifying the event as the open event, generating, by the processor, a service record associated with the user, the first entity, and the event; in response to identifying the event as the update event, updating, by the processor, the service record associated with the user, the first entity, and the event; and in response to identifying the event as the close event, closing, by the processor, the service record associated with the user, the first entity, and the event.

In some embodiments, the identifying of the particular entity further includes: identifying, by the processor, an open service record associating the particular entity and the user with a previous event.

In some embodiments, the one or more second entities are predicted to be impacted within a threshold level of confidence.

In some embodiments, the predicting the impact includes: maintaining, by the processor, a model for each particular industry vertical of a plurality of industry verticals, each of the models modeling a correlation of a plurality of first events associated with the particular industry vertical to other ones of the plurality of industry verticals; identifying, by the processor, the particular industry vertical associated with the first entity associated with the event; retrieving, by the processor, the model for the identified particular industry vertical; providing, by the processor, information on the event to the retrieved model; receiving, by the processor, identification of one or more second industry verticals correlated to the event; and determining, by the processor, whether the one or more second entities are associated with the one or more second industry verticals.

In some embodiments, the method further includes: monitoring, by the processor, a second event generated by the identified particular entity, the identified particular entity being associated with the one or more second industry verticals; and updating, by the processor, a corresponding model for the identified particular industry vertical based on the second event.

In some embodiments, the method further includes: receiving, by the processor, a user selection from one of the unaffiliated entities, the user selection including the one or more second entities trusted by the user.

In some embodiments, the identifying the one or more second entities is based on the user selection.

In some embodiments, the event is one among a plurality of predetermined events associated with the first one of the contact center systems that are predefined by the cross-entity server.

According to some embodiments of the invention, there is provided a cross-entity communication system for establishing communication across contact center systems of unaffiliated entities, the cross-entity communication system being external to the contact center systems of the unaffiliated entities, the system including: a processor; and memory storing instructions that, when executed on the processor, cause the processor to perform: receiving a first signal from a first server of a first one of the contact center systems, the first signal being indicative of an event associated with a first entity of the unaffiliated entities; identifying a user based on an identifier embedded within the first signal; identifying one or more second entities from among the unaffiliated entities, wherein the second entities are identified as being trusted by the user; predicting impact of the event on the one or more second entities; identifying a particular entity from among the one or more second entities predicted to be impacted by the event; and generating a second signal for transmission to a second server of a second one of the contact center systems associated with the identified particular entity, the second signal including data corresponding to the user and the event.

In some embodiments, the event is associated with a user interaction with the first entity.

In some embodiments, the identifying of the particular entity further includes:

identifying an open service record associating the particular entity and the user with a previous event.

In some embodiments, the one or more second entities are predicted to be impacted within a threshold level of confidence.

In some embodiments, the predicting the impact includes: maintaining a model for each particular industry vertical of a plurality of industry verticals, each of the models modeling a correlation of a plurality of first events associated with the particular industry vertical to other ones of the plurality of industry verticals; identifying the particular industry vertical associated with the first entity associated with the event; retrieving the model for the identified particular industry vertical; providing information on the event to the retrieved model; receiving identification of one or more second industry verticals correlated to the event; and determining whether the one or more second entities are associated with the one or more second industry verticals.

In some embodiments, the instructions further cause the processor to perform:

monitoring a second event generated by the identified particular entity, the identified particular entity being associated with the one or more second industry verticals; and updating a corresponding model for the identified particular industry vertical based on the second event.

In some embodiments, the instructions further cause the processor to perform:

receiving a user selection from one of the unaffiliated entities, the user selection including the one or more second entities trusted by the user.

In some embodiments, the identifying the one or more second entities is based on the user selection.

In some embodiments, the event is one among a plurality of predetermined events associated with the first one of the contact center systems that are predefined by the cross-entity server.

According to some embodiments of the invention, there is provided a system for establishing communication across contact center systems of unaffiliated entities, the system being external to the contact center systems of the unaffiliated entities, the system including: means for receiving a first signal from a first server of a first one of the contact center systems, the first signal being indicative of an event associated with a first entity of the unaffiliated entities; means for identifying a user based on an identifier embedded within the first signal; means for identifying one or more second entities from among the unaffiliated entities, wherein the second entities are identified as being trusted by the user; means for predicting impact of the event on the one or more second entities; means for identifying a particular entity from among the one or more second entities predicted to be impacted by the event; and means for generating a second signal for transmission to a second server of a second one of the contact center systems associated with the identified particular entity, the second signal including data corresponding to the user and the event.

As will be appreciated by a person of skill in the art, the system and method according to the various embodiments provide a technical improvement in the dissemination of information among contact center systems that is based on predictions as to whether an event associated with an entity serviced by one contact center system, impacts entities serviced by other contact center systems. Such intelligent dissemination of information helps reduce unnecessary alerts/notifications to the contact center systems, while helping improve customer satisfaction in interacting with such contact center systems.

BRIEF DESCRIPTION OF THE DRAWINGS

The accompanying drawings, together with the specification, illustrate example embodiments of the invention, and, together with the description, serve to explain the principles of the invention.

FIG. 5B is a photograph of a graphical user interface presented to an agent of a contact center supporting a trusted entity, which has received an alert regarding an event, according to some exemplary embodiments of the present invention.

DETAILED DESCRIPTION

Figure 1:
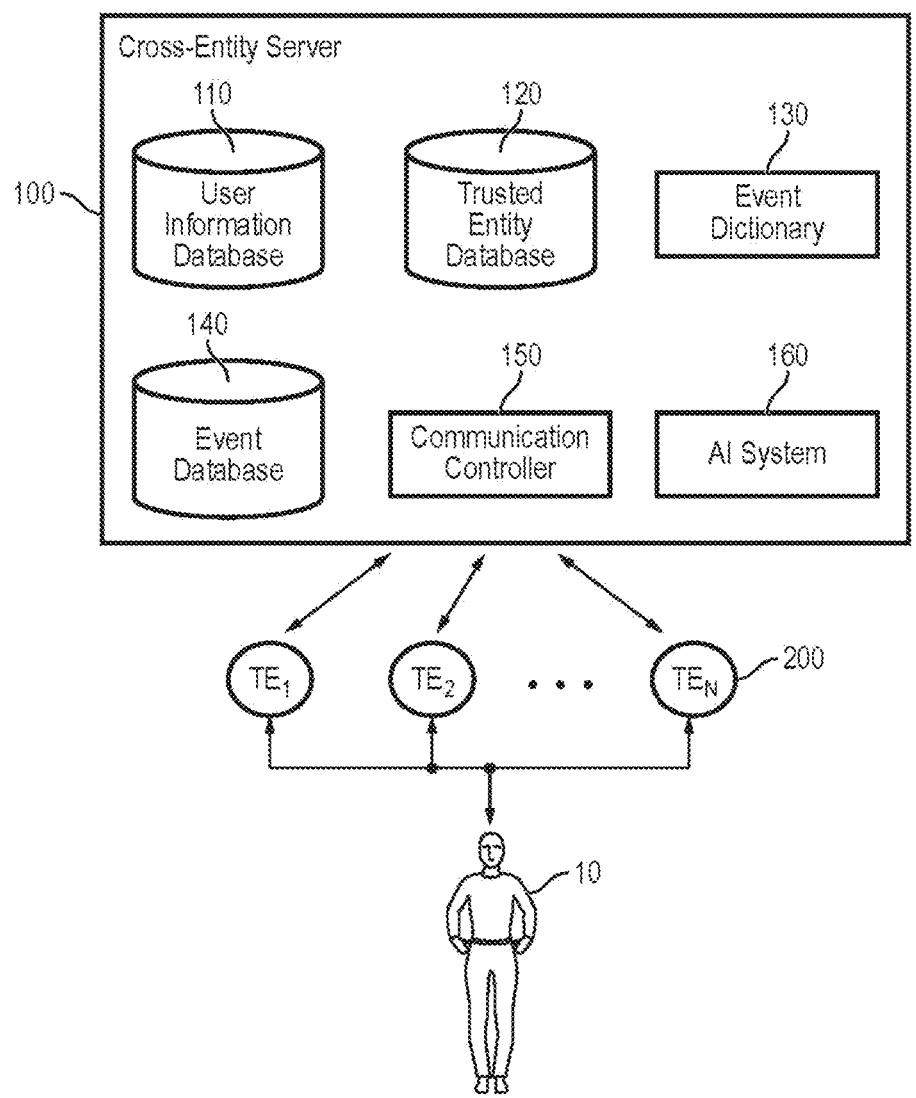
FIG. 1 is a block diagram illustrating a cross-entity communication system (CCS), according to some exemplary embodiments of the present invention.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

In general terms, embodiments of the invention are directed to a system and method that enables communication of user activity information between unaffiliated entities that are trusted by a user. Each of the unaffiliated entities may be a business or organization that may not have an established channel of communication with the other entities for automatically communicating relevant user activity, except through the cross-entity communication system of the present invention. The user may be a current or potential customer/consumer of the products and/or services offered by each of the trusted entities.

According to some embodiments, the cross-entity communication system (also referred to as a cross-entity server) facilitates the limited but effective sharing of pertinent user activity (e.g., commercial activity) among the set of trusted entities in order to provide efficiencies in the services provided by the trusted entities to enhance the user's experience in engaging with each of the entities.

In some embodiments, the user defines the set of trusted entities for which the user wishes to enable information sharing. Although trust is used as an example, there may be other reasons why the user may want to enable information sharing amongst the identified entities. Thus, the various embodiments of the invention are not limited to just trusted entities, but may extend generally to entities that the user has identified as enabled for information sharing. These entities will be referred to as trusted entities for sake of convenience.

Each trusted entity commits to notifying the cross-entity communication system of any user activity that falls within a predefined list of monitored events or activities including, for example, open events, update events, and close events. Upon receiving a notification from a trusted entity of a monitored user activity, the cross-entity communication system invokes an artificial intelligence (AI) system to determine which of the other trusted entities are impacted by (e.g., affected by) the activity, and notifies those impacted entities that have an open service record (e.g., an in-progress service) with the user. The notified entities may invoke servers on their end to process the received activity information and determine whether or not to take action based on results of the processing. If it is determined that an action is to be taken, the servers may, in one embodiment, display the actions as recommendations on an agent device to prompt the agent to take the recommended actions. In some embodiments, the servers may take the actions automatically without human involvement. For example, the servers may send automatic emails or notifications to the user.

A representative use case may help illustrate some of the embodiments of the present invention.

In one use case, a user may express on the website of airline A (through a graphical user interface presented by the website) that she trusts airline A, coffee shop B, hotel C, car rental company D, ride sharing service E, auto insurance company F, and credit card company G. The contact center of airline A notifies the cross-entity communication system of the selected group of trusted commercial entities. The cross-entity communication system maintains on file the user's unique identifier (e.g., an identifying number), address, telephone number, email address, Twitter and Facebook handles, and/or the like.

The user books a trip from San Francisco to Milan with airline A, by a phone call or through the Internet. The contact center of airline A communicates to the cross-entity communication system that a service has been started, and the cross-entity communication system opens a new service record for the user-airline A pair. The cross-entity communication system then utilizes an artificial intelligence (AI) system to determine which entity from the group of trusted entities can potentially be impacted by the booking. The AI system identifies the coffee shop B, the hotel C, the car rental company D, the ride sharing service E, and the credit card company G, and alerts the entities of the user action (i.e., the booking). The alert may include the user's unique identifier and information about the event (e.g., "FlightBooking" and details about arrival and return dates). A unique service identifier of the service initiated for the user may also be created and forwarded to the trusted entities.

The hotel C and the ride sharing service E detect that the user has a reservation with them, but contact center agents of neither entity see any reason to engage with the user. The coffee shop B notices a promotional opportunity and sends a text message to the customer that offers a 20% off discount at new stores recently opened in Milan. The credit card company G determines that the customer has a credit card with the company and proactively sends a communication (e.g., email or text message) to the user indicating that a travel alert notice has been automatically placed on the credit card for the travel period.

One week prior to the scheduled departure date, the user is forced to postpone the trip to Milan by a week due to a work emergency, and contacts airline A to change the flight reservation. The contact center of airline A notifies the cross-entity communication system of the change in flight dates. By invoking the AI system, the cross-entity communication system determines that this change may impact the coffee shop B, the hotel C, the car rental company D, and the credit card company G, and sends alerts to those entities. The coffee shop B responds by sending a text message to the user confirming that the discount will also be valid one week later. The contact center of the hotel C creates a workitem with details about the customer's current hotel reservation as well as the updated flight dates. The workitem is routed to a contact center agent of the hotel C who engages the customer by calling the customer with information on alternative accommodation options and prices and by offering to change the reservation. The car rental company D also engages the customer in a similar way. The credit card company responds by automatically updating the dates of the travel alert notification on the card and sending a communication to the customer informing her of the change.

Thus, by invoking the cross-entity communication system through, for example, changing a flight reservation, the customer is spared the trouble of having to contact each of the appropriate entities individually to make the necessary changes. This streamlined communication and notification process reduces or minimizes the customer's involvement, and greatly improves the customer's experience. In addition, the various customer contact centers impacted by the change may proactively engage in communication with the customer helping maintain or raise metrics indicative of customer satisfaction with the various contact centers.

FIG. 1 is a block diagram of a cross-entity communication system 100, according to some exemplary embodiments of the present invention.

Referring to FIG. 1, the cross-entity communication system ("CCS"; e.g., a cross-entity server) 100 acts as an information broker between a number of entities 200 (e.g., $TE_1$ to $TE_N$, N being an integer greater than 1) that are trusted by a user 10. Although a single user is depicted in FIG. 1 for illustration purposes, a person of skill in the art should recognize that that the CCS is capable of brokering communication for multiple users of the system. The trusted entities 200 may be unaffiliated. For example, the entities may not have another channel for automatically transmitting or receiving event notifications and alerts as described in the embodiments herein, aside from the CCS 100.

According to some embodiments, the CCS 100 includes a user information database 110 for storing user identification information, a trusted entity database 120 for storing information related to the trusted entity, an event dictionary 130 including a list of predefined events for each trusted entity, an event database 140 for keeping track of interactions users 10 have with trusted entities 200 by storing events and updating the state of a service record related to each pair of user and trusted entity, a communication controller 150 for handling communications to and from each trusted entity 200, and an artificial intelligence (AI) system 160 for determining impacted trusted entities for a given user event.

In some examples, the user identification information stored in the user information database 110 may include the user's name, address, telephone number, email address, username, a unique identifier (which may be alphanumeric), and/or any other identifying information. The user information database 110 may also store a set of entities that are trusted by the user 10, which may share event information associated with particular user activity pertaining to the trusted entities.

According to some examples, the user 10 may indicate or update the set of trusted entities through any one of the unaffiliated entities. For example, an entity may present a user 10 with a graphical user interface (e.g., through a webpage of the entity) that allows the user 10 to make or adjust a selection of entities that are trusted by the user 10, and for which certain information may be shared. Once the selection is made, the entity informs the CCS 100 of the selection, which prompts the CCS 100 to update the corresponding service record within the user information database 110.

According to one embodiment, the CCS 100 monitors actions taken by the user in regards to start, update, or closing of a journey/service. According to one embodiment, a journey includes one or more of a sequence of journey stages where each of the journey stages may involve an interaction with one or more of the trusted entities 200. According to one embodiment, interactions with the various trusted entities during a particular journey are monitored by the CCS for maintaining, for example, a timeline of the interactions. When a user 10 engages in a particular interaction with a trusted entity 200 (e.g., when the user 10 makes a flight reservation at an airline website) during a particular journey, the trusted entity 200 (e.g., an inbound/outbound server of the contact center of the trusted entity 200) sends a notification (e.g., a first signal) to the CCS 100, which is received by the communication controller 150. The notification received by the communication controller 150 may be an electronic signal that is compatible with the appropriate communication protocol and may be transmitted via the Internet or a direct communication channel that may include wired and/or wireless communication channels.

According to some embodiments, the notification (e.g., the first signal) includes embedded information that identifies the user 10 (e.g., the user's unique identifier, name, email, etc.) and the trusted entity 200 (e.g., a trusted entity ID), and an event that matches one of the predefined events identified in the event dictionary 130. According to one embodiment, the event transmitted in the notification also includes an identifier of the journey associated with the interaction. The notification may further include certain information related to the event, such as a flight destination, dates of an updated reservation, fare increase, credit line limit of an approved credit card application, or the like.

In some examples, the event dictionary 130, or at least those events from the event dictionary 130 that pertain to the trusted entity 200, may be provided to the trusted entity 200 in advance of any such notification.

In some embodiments, the event dictionary 130 may store different classes of predefined events for each trusted entity. Exemplary classes of events include start events, update events, and close events. Each class of events may include a list of events that may be specific to a trusted entity or to an industry vertical to which such trusted entity belongs.

According to one embodiment, start events trigger the opening of a new service record associated with a journey, within the event database 140, for the user-entity pair. Examples of events that open a service record for the airline industry may include "New Ticket Issued", "New Reservation Issued", and/or the like. In this example, the new service record or journey may be identified as an "airline reservation" service or journey that may be identified via a unique service record or journey ID. Examples of start events for the finance industry may include "New Credit Card Requested" (for a "credit card application" journey), "New Home Loan Requested" (for a "mortgage" journey), "New Personal Loan Requested" (for a "personal loan" journey), "New Auto Loan Requested" (for a "car loan" journey), and/or the like. A user may have one or more open journeys at a time.

Update events trigger an update of an existing open service record, within the event database 140, for the user-entity pair. Examples of events that update a service record for the airline industry may include "Existing Reservation Changed", "Existing Reservation Upgraded", "Flight delayed", and/or the like. Examples of events that update a service record for the finance industry may include "Credit Card—More Info Requested", "Home Loan—More Info Requested", "Auto Loan—More Info Requested", "Documents For A Loan Received", and/or the like.

Close events trigger the closing of an existing open service record, within the event database 140, for the user-entity pair. Examples of events that close a service record for the airline industry may include "Flight Landed", "Reservation Cancelled", "Account Cancelled", and/or the like. Examples of events that close a service record for the finance industry may include "Credit Card Request Denied/Approved", "Home Loan Request Denied/Approved", "Auto Loan Request Denied/Approved", and/or the like.

Upon receiving an event notification from a trusted entity 200, the CCS 100 may store the association between the event and the corresponding user 10 and trusted entity 200 within the event database 140. The event notification may optionally also include the identifier of the journey associated with the event. According to one embodiment, the CCS 100 further invokes the AI system 160 to predict which of the user's trusted entities 200 may be impacted by the notified event.

According to some embodiments, the AI system 160 utilizes a model (e.g., a statistical model) that correlates a plurality of input events for which the CCS 100 may receive a notification, with a plurality of industry verticals that are identified as being impacted by the notification. By utilizing the model and a machine learning algorithm, such as a one of various known regression or back propagation algorithms, the AI system 160 predicts the industry verticals that are impacted by the event.

According to one embodiment, the CCS 100 determines which of the user's trusted entities are associated with the impacted verticals by querying the trusted entity database which maintains the association between trusted entities and the corresponding vertical industries. The CCS 100 also queries the event database to identify those trusted entities that have an open service record and that optionally match the journey ID in the notification, and thus identifies the impacted trusted entities that are associated with the impacted vertical industries and also have an open service record with the user 10 associated with the notified event. The communication controller 150 then generates and sends an alert signal (e.g., a second signal) to each of the impacted trusted entities. However, embodiments of the present invention are not limited thereto, and in some examples, the communication controller 150 sends alerts to all trusted entities associated with the impacted industry verticals regardless of whether they have an open service record with the user 10 or not.

The alert to each of the impacted trusted entities may include information identifying the user 10 (e.g., the user's unique identifier) and certain information about the event (e.g., "FlightBooking" and details about arrival and return dates). The alert may provide those critical details about the event that are used by the recipient entity to provide further assistance to the user, and does not reveal non-critical/sensitive information such as the identity of the entity from which the event was originated. The alert may take many forms, and may be customized for the receiving trusted entity. For example, the alert may be a workitem sent to a particular capture point (e.g., server) within the contact center of the impacted trusted entity that may later be routed to an agent group within the contact center that is responsible for dealing with this form of cross-entity notification. In other examples, the alert may be an email or text message communication including certain details about the event, or a communication through any other suitable medium. The alert generated by the communication controller 150 may be an electronic signal that is compatible with the appropriate communication protocol and may be transmitted via the Internet or a direct communication channel that may include wired and/or wireless communication channels.

Upon receiving the alert, each trusted entity may decide how to respond in an appropriate way, which may depend on the entity's business operations protocols. For example, when a trusted entity that is a hotel receives an alert about a hotel customer's change of flight reservations, the hotel may choose to automatically adjust the dates of the customer's hotel reservation, and later notify the customer about the change.

According to some embodiments, the various components of the CCS 100 may be integrated together as one unit, or may represent geographically disparate components (e.g., cloud components) that are communicatively coupled together via the Internet or the cloud.

Figure 2:
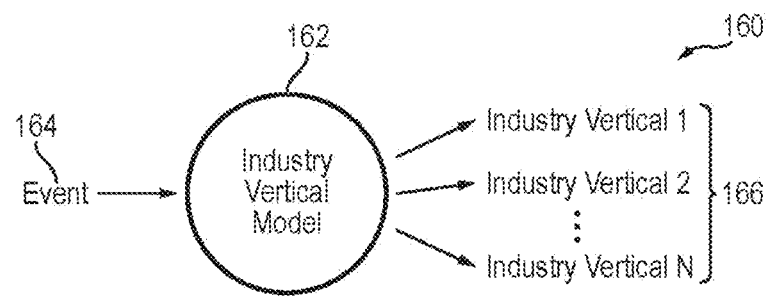
FIG. 2 is a conceptual diagram illustrating an AI system, according to some exemplary embodiments of the present invention.

FIG. 2 is a conceptual diagram of the AI system 160, according to some exemplary embodiments of the present invention.

According to some embodiments, the AI system 160 maintains a plurality of models (e.g., statistical models) 162 for the plurality of industry verticals, which represent the unaffiliated entities that are in communication with the CCS 100. Each model 162 correlates a plurality of first events 164 associated with the particular industry vertical that corresponds to the model 162, with other ones of the plurality of industry verticals 166 that may be impacted by the first events. In some embodiments, the plurality of first events may represent the three classes of predefined events (e.g., start events, update events, and close events) associated with the particular industry vertical, which are defined by the event dictionary 130.

In some embodiments, the plurality of models 162 correspond to neural networks and/or deep neural networks (a deep neural network being a neural network that has more than one hidden layer, for use with deep learning techniques), and the process of generating the models 162 may involve training the deep neural networks using training data (described further below) and an algorithm, such as a back propagation algorithm. In this regard, each model 162 is invoked to compute the expected value (or the confidence level) of an industry vertical being impacted by a particular event supplied as input to the model.

Each of the models 162 may include a set of weights for each of the parameters of a linear regression model, or the models 162 may include a set of weights for connections between the neurons of a trained neural network. In some embodiments, a particular event is supplied to each model 162 as a value to the input layer of the neural network, and the value (or a set of intermediate values) is forward propagated through the neural network to generate an output, where the output corresponds to a prediction of the impacted industry verticals, given the particular input event.

Generally, the AI system 160 is trained to identify industry verticals that may be impacted when a specific event occurs (e.g., a travel reservation might impact hotel bookings, car rentals, credit cards, etc.). In some embodiments, the AI system 160 is trained with examples of correlations between given events and the list of industry verticals that are impacted. One training example may be generally expressed as:

Event (industry)→(industry 1, industry 2, . . . industry n)

For example, a correlation may be expressed as:

ChangeReservation (Airline)→(Hospitality, Transportation, Insurance, Finance)

According to some embodiments, a specific model 162 is trained for each corresponding industry vertical; however, embodiments of the present invention are not limited thereto, and the model 162 may be trained for a group of industry verticals.

In some examples, the AI system 160 may be a specialized AI or a general AI, such as IBM Watson, or the like.

According to one embodiment, when the communication controller 150 receives an event notification from a source entity, the CCS 100 identifies the industry vertical associated with the source entity, and invokes the AI system 160 to predict which industry verticals are affected by the event. The CCS 100 then identifies those trusted entities of the user 10 that are associated with the impacted industry verticals, and sends an alert to those trusted entities along with information (e.g., critical information) regarding the event. In some embodiments, the CCS 100 queries the event database 140 for any open service records, and sends alerts only to those impacted trusted entities that have an existing open service record in the event database 140.

Figure 3:
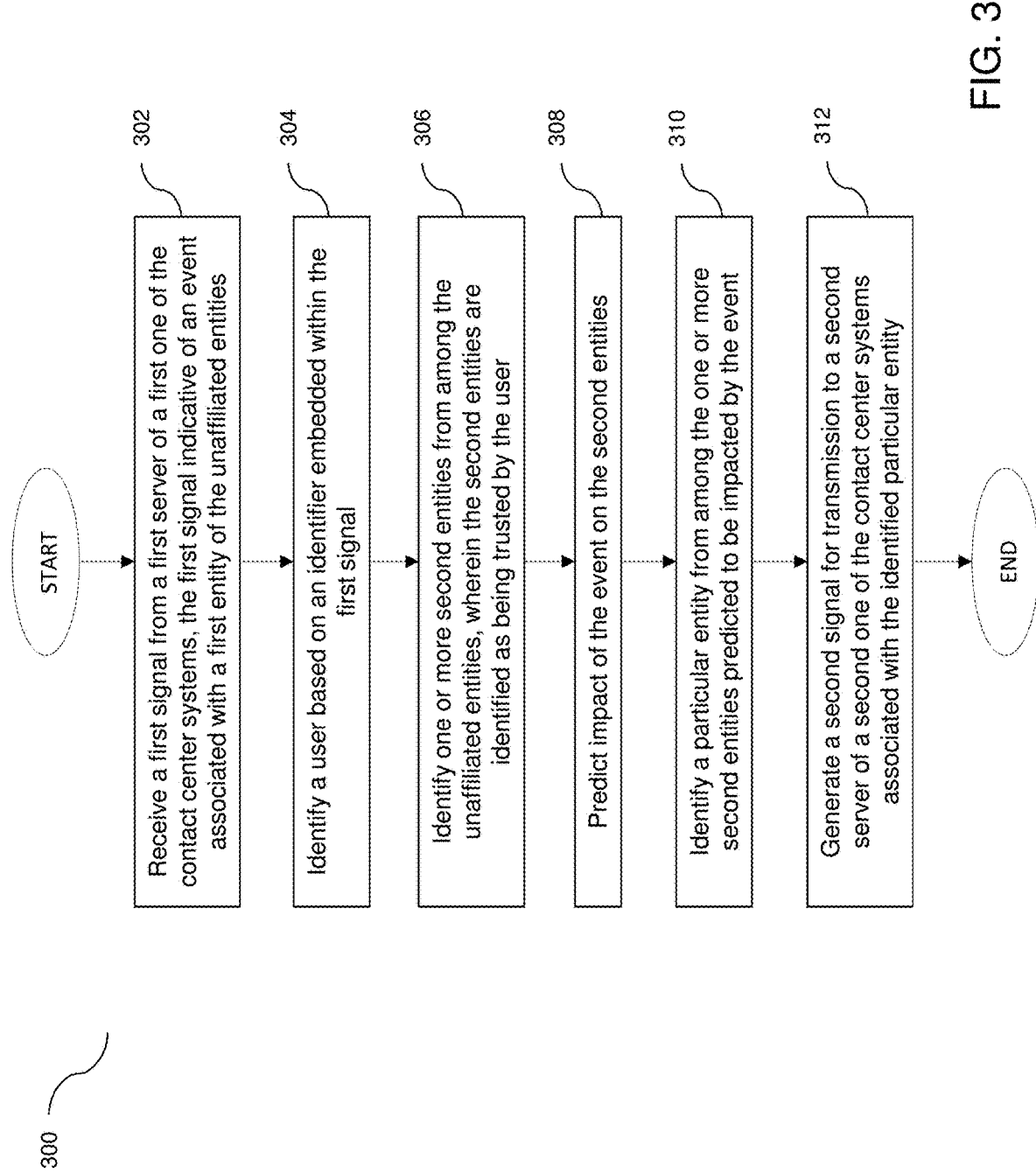
FIG. 3 is a flow diagram illustrating a process of establishing communication across contact center systems of unaffiliated entities using the cross-entity communication system, according to some exemplary embodiments of the present invention.

FIG. 3 is a flow diagram illustrating a process 300 of establishing communication across contact center systems of unaffiliated entities using the CCS 100 that is external to the contact center systems of the unaffiliated entities, according to some exemplary embodiments of the present invention.

In act 302, the communication controller 150 receives notification (e.g., a first signal) from a first server of a first one of the contact center systems. The first one of the contact center systems may correspond to a first entity 200 of the unaffiliated entities, and the notification may be indicative of an event associated with the first entity. The event (e.g., flight changed) may be associated with a user interaction (e.g., changing a flight reservation) with the first entity (e.g., an airline).

In act 304, the CCS 100 identifies a user 10 (e.g., a customer of the products and/or services of at least one of the unaffiliated entities) based on an identifier embedded within the notification. The identifier may be the user's name, address, telephone number, email address, username, a unique identifier, and/or any other identifying information. The CCS 100 may further identify a particular journey of the user 10 that is open (e.g. based on a journey ID provided in the notification).

In act 306, the CCS 100 queries the user information database 110 to identify one or more second entities from among the unaffiliated entities that are indicated by the user 10 as being trusted entities.

In act 308, the CCS 100 invokes the AI system 160 to predict the impact of the event on the second entities. In so doing, the AI system 160 may assign a confidence/certainty level to each prediction, and indicate impact on the second entities if the confidence/certainty level is above a preset threshold.

In act 310, the CCS 100 utilizes the results of the predictions made by the AI system 160 to identify one or more particular entities from among the one or more second entities that is predicted to be impacted by the event. For example, when the event is a flight change, the CCS 100 may identify a trusted hotel entity and a trusted car rental entity as being potentially impacted by the flight change.

In some embodiments, the output by the AI system 160 of impacted verticals may be a generic list of vertical entities along with a confidence level indicative of the impact for each vertical entity. For example, changing a flight reservation may be predicted to generally impact a hospitality industry vertical with an 80% confidence level, a transportation industry vertical with a 60% confidence level, and a healthcare industry vertical with a 20% confidence level. The specific entity in the identified industry vertical may be identified by querying the user information database 110. The query provides identification of the particular entities that correspond to the generic industry verticals, that the user has identified as being trusted, and for which a service record remains open.

In act 312, the communication controller 150 generates an alert (e.g., a second signal) for transmission to the one or more particular entities. The alert may be transmitted to, and received by, one or more servers (e.g., servers configured to interact with the CCS) of one or more contact centers associated with (e.g., supporting) the one or more identified particular entities. The alert may include data corresponding to the user 10 and the event. For example, an alert for an event that is a flight change may inform the one or more particular entities of not only the fact that the flight has changed, but also provide the new (and even old) flight details (e.g., departure and/or arrival date(s) and time(s)).

In some examples, each of the notification and the alert is an electronic signal that is formatted according to a protocol that may be standard across the unaffiliated entities or may be customized for each entity.

In some embodiments, the CCS 100 may send the notifications only to those impacted trusted entities that have an existing, open service record at the event database 140. In so doing, the CCS 100 may query the event database 140 prior to invoking the AI system 160 (e.g., in act 306), and narrow the one or more second entities to those that have an open service record, or the CCS 100 may query the event database 140 after invoking the AI system 160 (e.g., in act 310) and identify only those particular trusted entities that are predicted as being impacted by the event and that also have an open service record. As will be appreciated by a person of skill in the art, the identification of entities predicted to be impacted by an event associated with an unaffiliated entity before sending an alert to those entities, helps reduce unnecessary alerts/notifications to those entities.

Figure 4:
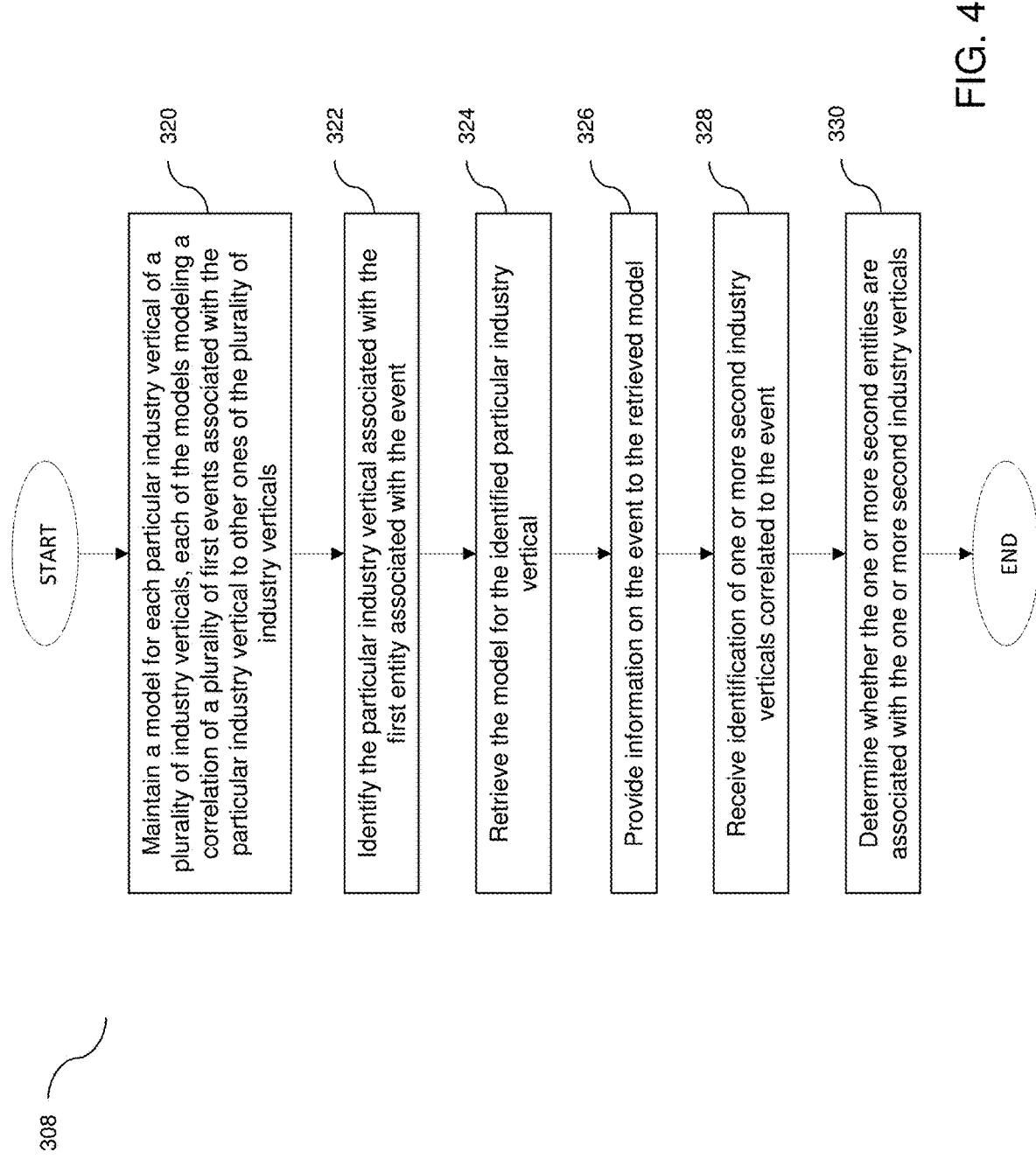
FIG. 4 is a flow diagram illustrating a process of predicting the impact of an event on one or more trusted entities, according to some exemplary embodiments of the present invention.

FIG. 4 is a more detailed flow diagram of the process 308 of predicting the impact of the event on the one or more second entities, according to some exemplary embodiments of the present invention.

In act 320, the AI system 160 maintains, according to some embodiments, a specific model (e.g., a statistical model) 162 for each particular industry vertical of a plurality of industry verticals. Each of the models 162 may model a correlation of a plurality of first events associated with the particular industry vertical to other ones of the plurality of industry verticals. In some examples, the plurality of first events may be defined by the event dictionary 130.

In act 322, the AI system 160 identifies the particular industry vertical associated with the first entity that is associated with the event. For example, in the case of a hotel entity, the CCS 100 may identify hospitality as an industry vertical, and in the case of a car sharing service entity, the CCS 100 may identify transportation as an industry vertical. The industry verticals may be predefined by the CCS 100.

In act 324, the AI system 160 retrieves the corresponding model 162 for the identified particular industry vertical, and, in act 326, provides the event as an input to the retrieved model 162.

In act 328, the AI system 160 receives identification of one or more second industry verticals correlated to the event from the retrieved model 162, and in act 330, determines whether the one or more second entities, which are trusted by the user 10, are associated with the one or more second industry verticals. As described above, this information is then used to identify those trusted entities of the user 10 that are predicted to be impacted by the first event.

According to some embodiments, the AI system 160 continuously refines the models 162 by utilizing further reported events as feedback. For example, the CCS 100 continues to monitor the identified particular entity for any received notification of events, and identifies a second event generated by the identified particular entity. The CCS 100 then invokes the AI system 160 to update the retrieved model 162, which corresponds to the identified particular industry vertical, using the second event. According to some examples, an analytics tool may monitor (e.g., periodically/continuously monitor) the determinations made by the AI system 160 and compare with real world data and feedback to identify events or class of events that may benefit from further training, and initiate appropriate training.

FIGS. 5A-5D illustrate photographs of graphical user interfaces at various stages of the process 300 of FIG. 3, according to some exemplary embodiments of the present invention.

Figure 5A:
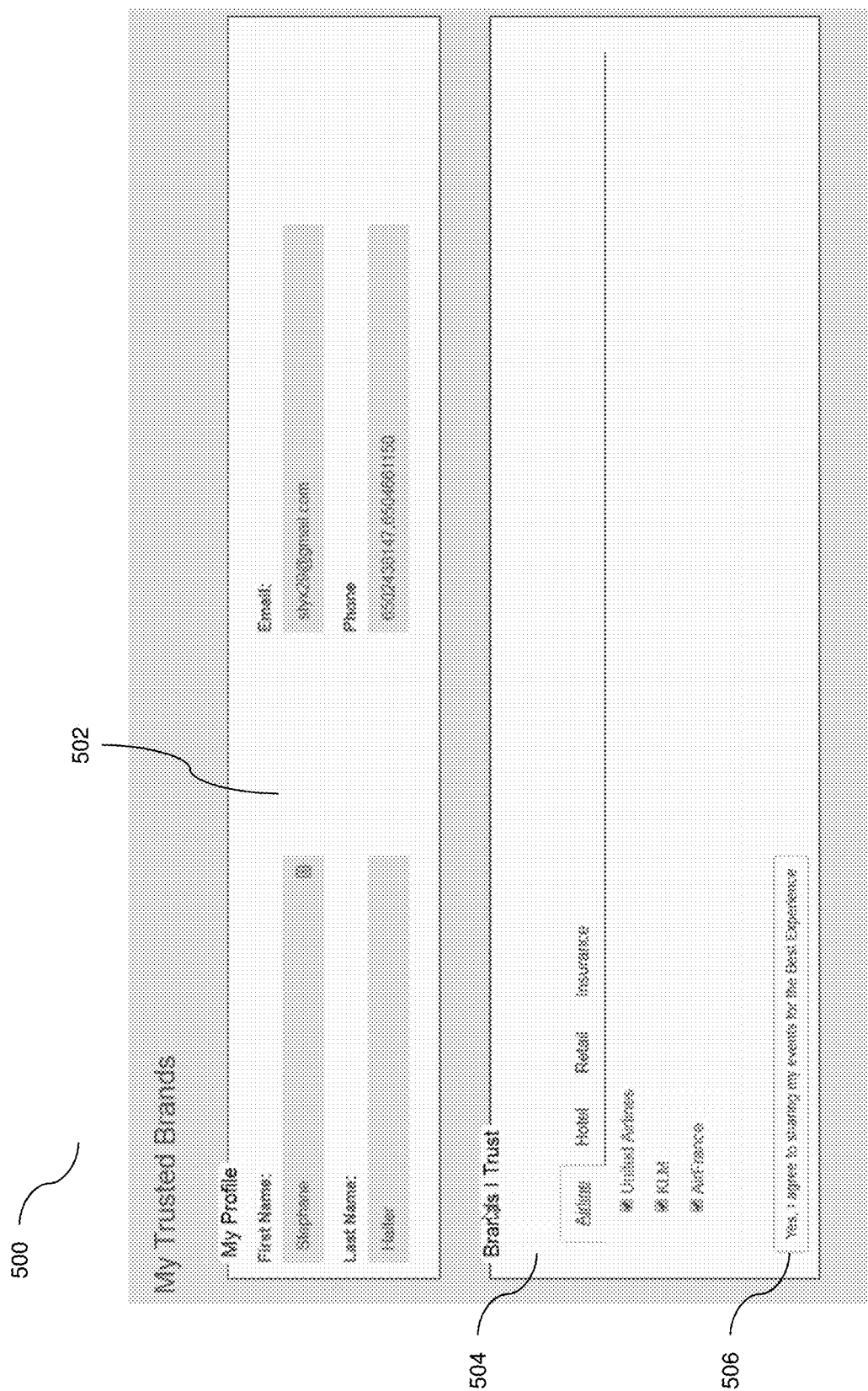
FIG. 5A is a photograph of a graphical user interface for setting up a user profile and for selecting the trusted entities, according to some exemplary embodiments of the present invention.

FIG. 5A is a photograph of a graphical user interface 500 for setting up a user profile and for selecting the trusted entities, according to some exemplary embodiments of the present invention.

According to some examples, a contact center of an entity of the plurality of unaffiliated entities may present the graphical user interface (GUI) 500 to a user 10 (e.g., a customer of the entity), which may have a section 502 for setting up, editing, or viewing a user profile and a section 504 for selecting or modifying the user's trusted entities. The user profile may include identifying information, such as first name, last name, email address, phone number, and/or the like. Section 504 may present a number of unaffiliated entities (e.g., "KLM", "Air France", "United Airlines", "CSA Travel Protection", "Airbnb", etc.), which may be organized into industry verticals (e.g., "airline", "hotel", "retail", "insurance", and/or the like), that the user 10 may select from to identify the user's trusted entities. The user 10 may confirm the selection and data entry by actuating a button 506.

Once confirmed, the contact center of the entity presenting the GUI 500 may transmit the information collected through the GUI 500 to the CCS 100 (e.g., to the communication controller 150). The CCS 100 may then create or update the user's profile within the user information database 110.

While the description above describes the GUI 500 as being presented by one of the unaffiliated entities in communication with the CCS 100, the same or similar GUI may be made available to the user 10 by the CCS 100 (e.g., through a webpage provided by the CCS 100).

Figure 5B:
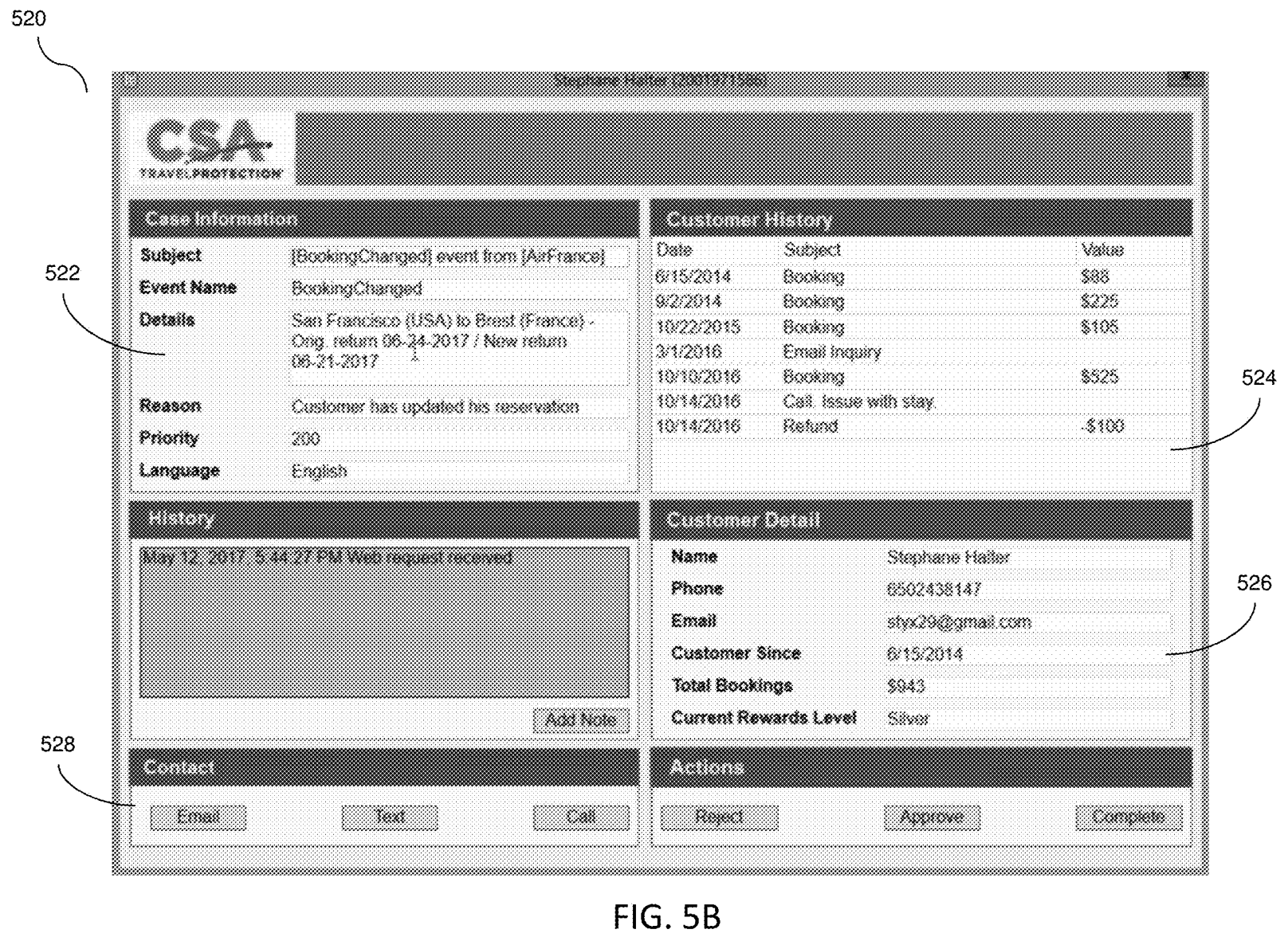

FIG. 5B illustrates a photograph of a graphical user interface 520 presented to an agent of contact center associated with (e.g., supporting) a trusted entity 200, which has received an alert regarding an event, according to some exemplary embodiments of the present invention.

When a trusted entity 200 receives an alert for an event from the CCS 100 (e.g., from the communication controller 150), a contact center associated with (e.g., supporting) the trusted entity 200 may generate a workitem with details of the event for an agent to review and to potentially take action on. In an example, the contact center may present the agent with the GUI 520, which displays details about the event that were received as part of the alert in section 522, displays the user's customer history in section 524, and displays the user's information in section 526. The GUI 520 may present a number of options for contacting the user 10 (e.g., via email, text message, telephone call, and/or the like) in section 528.

Figure 5C:
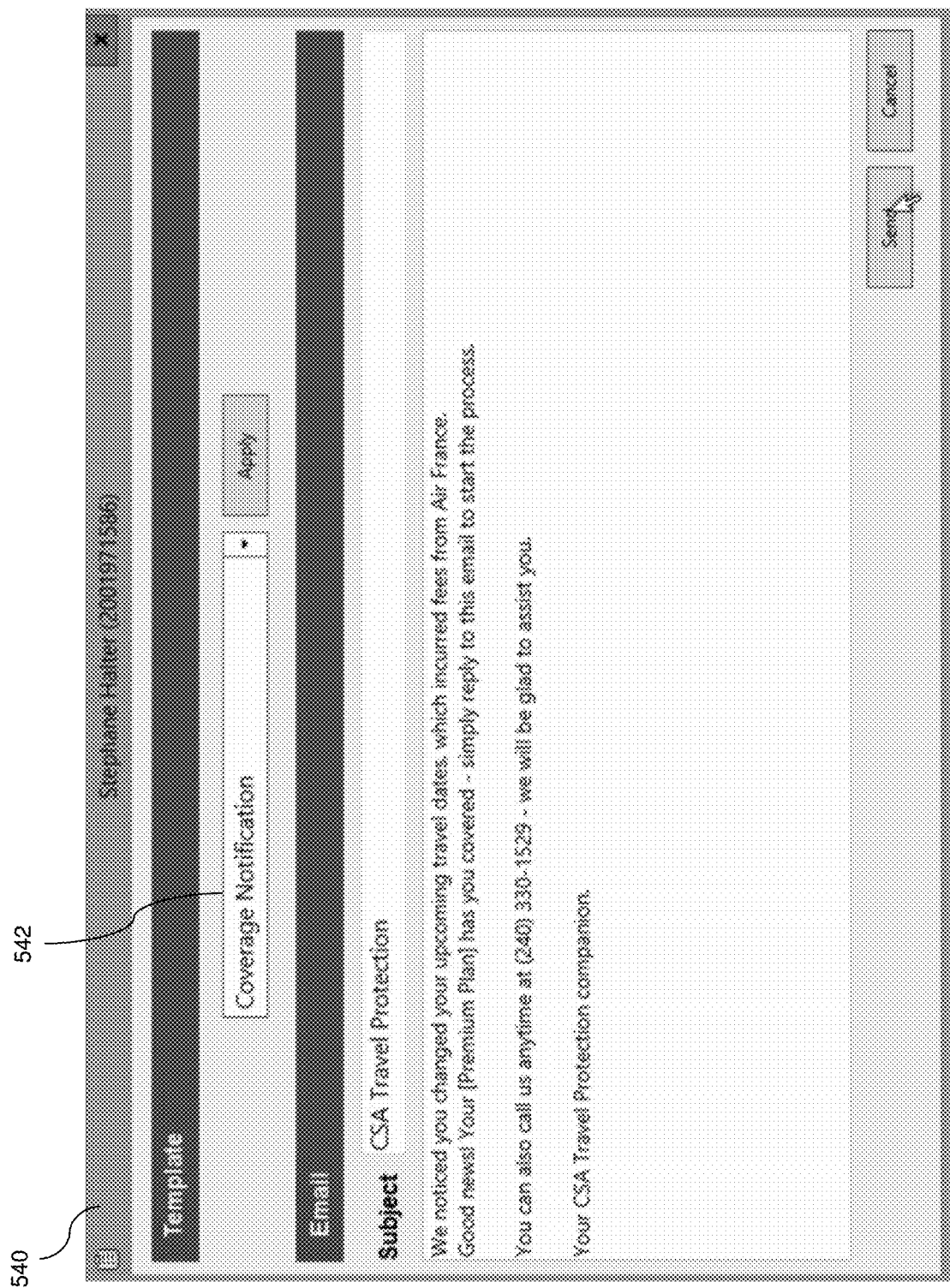
FIG. 5C is a photograph of an email interface for sending an email to a user pursuant to an alert being received by a trusted entity, according to some exemplary embodiments of the present invention.

FIG. 5C illustrates a photograph of an email interface 540 for sending an email to a user 10 pursuant to an alert being received by a trusted entity 200, according to some exemplary embodiments of the present invention.

When the agent described above with respect to FIG. 5B decides to contact the user about the event via email, the agent may draft an email from scratch or may choose a suitable template (e.g., from the drop-down menu 542) and modify it as needed prior to sending it to the user 10. Certain portions of the email, such as the "To" field, the subject line, and/or part or all of the message in the body of the email may be auto-populated by the contact center based on the user information on file and the event information received via the alert from the CCS 100.

Figure 5D:
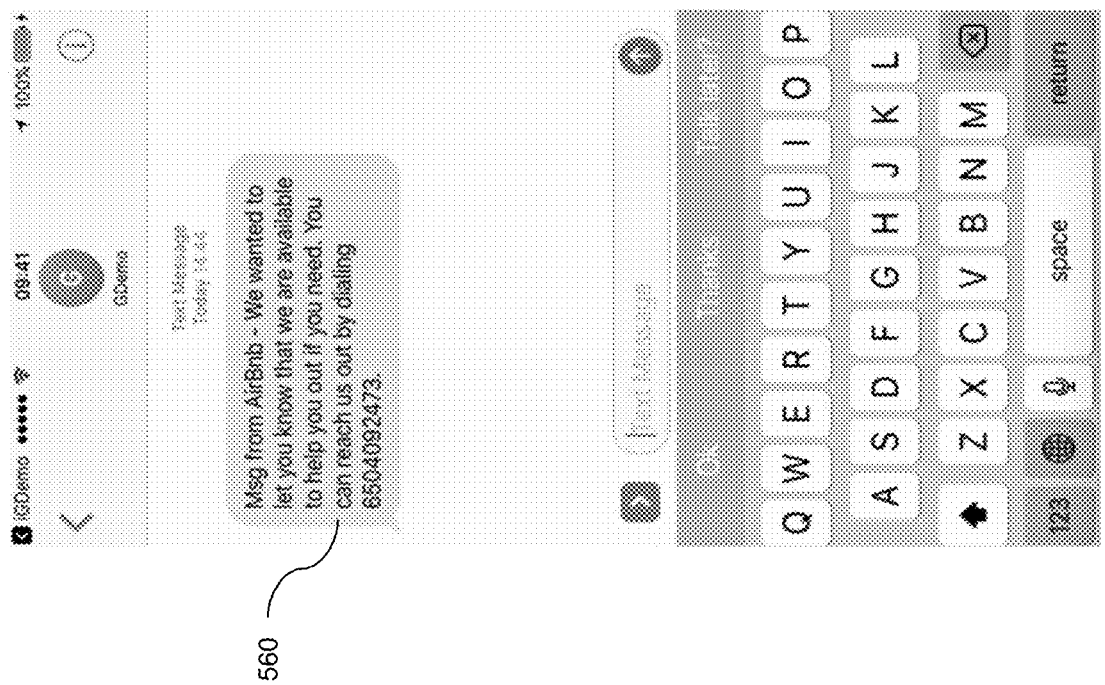
FIG. 5D is a photograph of a text messaging interface of a user device that has received a message pursuant to an alert being sent to a trusted entity, according to some exemplary embodiments of the present invention.

FIG. 5D illustrates a photograph of a text messaging interface 560 of a user device that has received a message pursuant to an alert being sent to a trusted entity 200, according to some embodiments of the present invention.

In addition to email, a contact center or an agent of a contact center of a trusted entity may contact the user 10 via text message to convey a message related to the event. The message may be automatically generated and sent by the contact center, or may be generated and/or sent by the agent of the contact center pursuant to receiving the alert.

Figure 6:
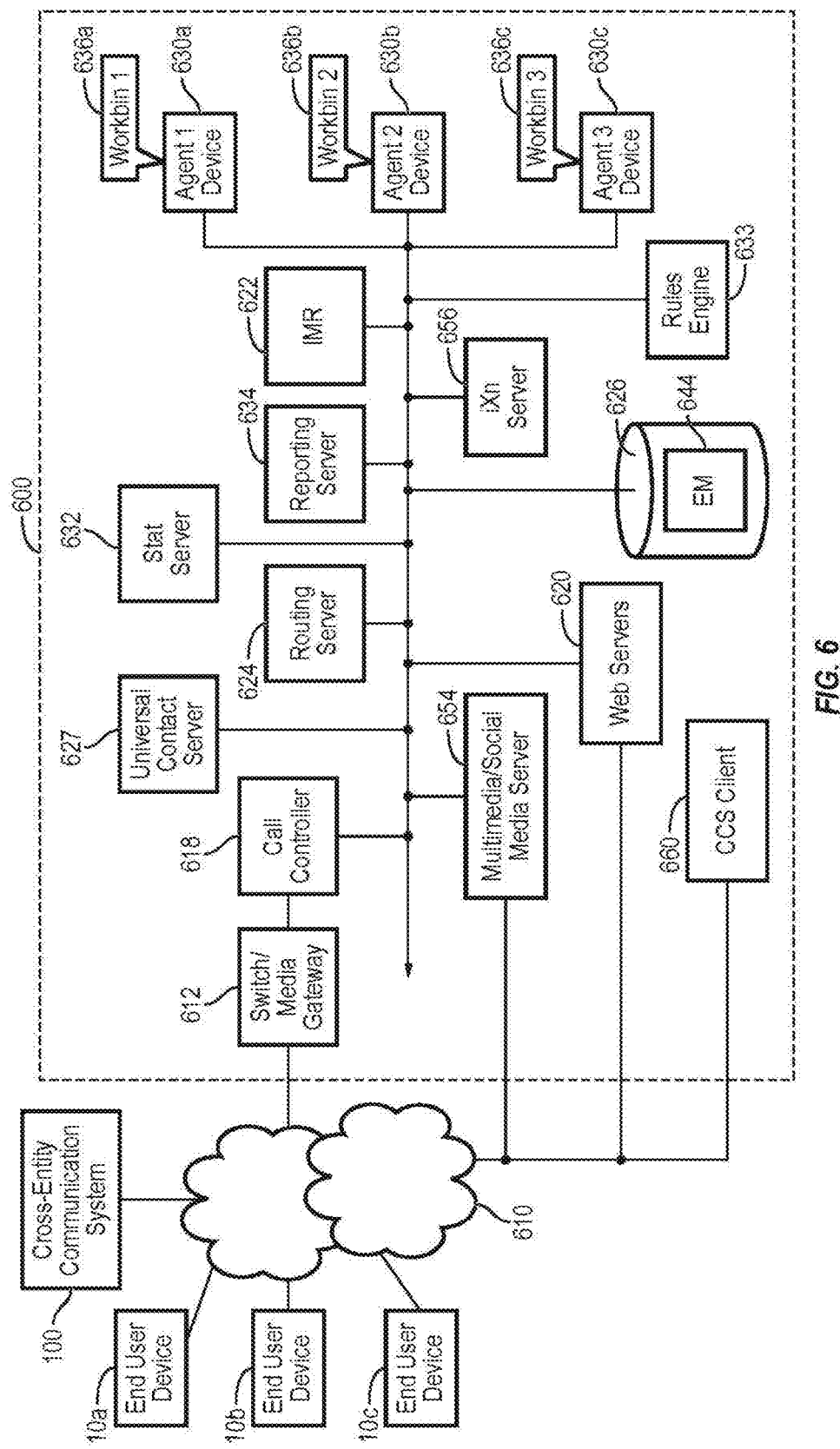
FIG. 6 is a schematic block diagram of a system for supporting a contact center, which supports a trusted entity, in providing contact center services, according to some exemplary embodiments of the invention.

FIG. 6 is a schematic block diagram of a system for supporting a contact center, which is associated with (e.g., supports) a trusted entity 200 that is in communication with the CCS 100, in providing contact center services, according to some exemplary embodiments of the invention.

The contact center of the trusted entity 200 may be an in-house facility of a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system 600 are hosted at the contact center premises and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system 600 may also be distributed across various geographic locations and computing environments and not necessarily contained in a single location, computing environment, or even computing device.

According to one example embodiment, the contact center system 600 manages resources (e.g., personnel, computers, and telecommunications equipment) to enable delivery of services via telephone or other communication mechanisms. Such services may vary depending on the type of contact center, and may range from customer service to help desk, emergency response, telemarketing, order taking, and the like. According to some embodiments, advanced notification services are provided by the contact center system 600 on agreements with its customers.

Customers, potential customers, or other end users (collectively referred to as customers or users, e.g., end users 10) desiring to receive services from the contact center may initiate inbound communications (e.g., telephony calls) to the contact center via their end user devices 608a-608c (collectively referred to as end user devices 608). Each of the end user devices 608 may be a communication device conventional in the art, such as, for example, a telephone, wireless phone, smart phone, personal computer, electronic tablet, and/or the like. Users operating the end user devices 608 may initiate, manage, and respond to telephone calls, emails, chats, text messaging, web-browsing sessions, and other multimedia transactions.

Inbound and outbound communications from and to the end user devices 608 may traverse a telephone, cellular, and/or data communications network 610 depending on the type of device that is being used. For example, the communications network 610 may include a private or public switched telephone network (PSTN), local area network (LAN), private wide area network (WAN), and/or public wide area network such as, for example, the Internet. The communications network 610 may also include a wireless carrier network including a code division multiple access (CDMA) network, global system for mobile communications (GSM) network, or any wireless network/technology conventional in the art, including but not limited to 3G, 4G, LTE, and the like.

According to one example embodiment, the contact center system 600 includes a switch/media gateway 612 coupled to the communications network 610 for receiving and transmitting telephony calls between end users and the contact center. The switch/media gateway 612 may include a telephony switch or communication switch configured to function as a central switch for agent level routing within the center. The switch may be a hardware switching system or a soft switch implemented via software. For example, the switch/media gateway 612 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device.

In this example, the switch/media gateway 612 establishes a voice path/connection (not shown) between the calling customer and the agent telephony device, by establishing, for example, a connection between the customer's telephony device and the agent telephony device.

According to some exemplary embodiments of the invention, the switch is coupled to a call controller 618 which may, for example, serve as an adapter or interface between the switch and the remainder of the routing, monitoring, and other communication-handling components of the contact center.

The call controller 618 may be configured to process PSTN calls, VoIP calls, and the like. For example, the call controller 618 may be configured with computer-telephony integration (CTI) software for interfacing with the switch/media gateway and contact center equipment. In some embodiments, the call controller 618 may include a session initiation protocol (SIP) server for processing SIP calls. According to some exemplary embodiments, the call controller 618 may, for example, extract data about the customer interaction such as the caller's telephone number, often known as the automatic number identification (ANI) number, or the customer's Internet protocol (IP) address, or email address, and communicate with other CC components in processing the interaction.

According to some exemplary embodiments of the invention, the system further includes an interactive media response (IMR) server 622, which may also be referred to as a self-help system, virtual assistant, or the like. The IMR server 622 may be similar to an interactive voice response (IVR) server, except that the IMR server 622 is not restricted to voice, but may cover a variety of media channels including voice. Taking voice as an example, however, the IMR server 622 may be configured with an IMR script for querying customers on their needs. For example, a contact center for a bank may tell customers, via the IMR script, to "press 1" if they wish to get an account balance. If this is the case, through continued interaction with the IMR server 622, customers may complete service without needing to speak with an agent. The IMR server 622 may also ask an open-ended question such as, for example, "How can I help you?" and the customer may speak or otherwise enter a reason for contacting the contact center. The customer's response may then be used by a routing server 624 to route the call or communication to an appropriate contact center resource.

If the communication is to be routed to an agent, the communication server 622 interacts with the routing server 624 to find an appropriate agent for processing the interaction. The selection of an appropriate agent for routing an inbound interaction may be based, for example, on a routing strategy employed by the routing server 624, and further based on information about agent availability, skills, and other routing parameters provided, for example, by a statistics server 632.

In some embodiments, the routing server 624 may also query a customer database, which stores information about existing clients, such as contact information, service level agreement (SLA) requirements, the nature of previous customer contacts and the actions taken by the contact center to resolve any customer issues, and the like. The customer database may also store information on responses/actions taken by recipients of notifications, and the stored information may be provided to a contact center agent for reference when dealing with another communication relating to the issue for which the notifications were transmitted. The database may be, for example, Cassandra or any NoSQL database, and may be stored in a mass storage device 626. The database may also be an SQL database and may be managed by any database management system such as, for example, Oracle, IBM DB2, Microsoft SQL server, Microsoft Access, PostgreSQL, MySQL, FoxPro, and SQLite. The routing server 624 may query the customer information from the customer database via an ANI or any other information collected by the IMR server 622.

Once an appropriate agent is identified as being available to handle a communication, a connection may be made between the customer and an agent device 630a-630c (collectively referred to as agent device 630) of the identified agent. Collected information about the customer and/or the customer's historical information may also be provided to the agent device for aiding the agent in better servicing the communication. In this regard, each agent device 630 may include a telephone adapted for regular telephone calls, VoIP calls, and the like. The agent device 630 may also include a computer for communicating with one or more servers of the contact center and performing data processing associated with contact center operations, and for interfacing with customers via voice and other multimedia communication mechanisms.

The contact center system 600 may also include a multimedia/social media server 654 for engaging in media interactions other than voice interactions with the end user devices 608 and/or web servers 620. The media interactions may be related, for example, to email, vmail (voice mail through email), chat, video, text-messaging, web, social media, co-browsing, and the like. In this regard, the multimedia/social media server 654 may take the form of any IP router conventional in the art with specialized hardware and software for receiving, processing, and forwarding multimedia events.

The web servers 620 may include, for example, social interaction site hosts for a variety of known social interaction sites to which an end user may subscribe, such as, for example, Facebook, Twitter, and the like. In this regard, although in the embodiment of FIG. 1 the web servers 620 are depicted as being part of the contact center system 600, the web servers may also be provided by third parties and/or maintained outside of the contact center premises. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real-time communication (WebRTC), or the like.

According to some exemplary embodiments of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real-time communication with a customer. In this regard, an interaction (iXn) server 656 interacts with the routing server 624 for selecting an appropriate agent to handle the activity. Once assigned to an agent, an activity may be pushed to the agent, or may appear in the agent's workbin 636a-636c (collectively referred to as workbin 636) as a task to be completed by the agent. The agent's workbin may be implemented via any data structure conventional in the art, such as, for example, a linked list, array, and/or the like. The workbin 636 may be maintained, for example, in a buffer memory of each agent device 630.

According to some exemplary embodiments of the invention, the mass storage device(s) 626 may store one or more databases relating to agent data (e.g., agent profiles, schedules, etc.), customer data (e.g., customer profiles), interaction data (e.g., details of each interaction with a customer, including reason for the interaction, disposition data, time on hold, handle time, etc.), and the like. According to some embodiments, some of the data (e.g., customer profile data) may be maintained in a customer relations management (CRM) database hosted in the mass storage device 626 or elsewhere. The mass storage device may take the form of a hard disk or disk array as is conventional in the art.

According to some embodiments, the contact center system 600 may include a universal contact server (UCS) 627, configured to retrieve information stored in the CRM database and direct information to be stored in the CRM database. The UCS 627 may also be configured to facilitate maintaining a history of customer preferences and interaction history, and to capture and store data regarding comments from agents, customer communication history, and the like.

The contact center system 600 may also include a reporting server 634 configured to generate reports from data aggregated by the statistics server 632. Such reports may include near real-time reports or historical reports concerning the state of resources, such as, for example, average waiting time, abandonment rate, agent occupancy, and the like. The reports may be generated automatically or in response to specific requests from a requestor (e.g., an agent/administrator, contact center application, and/or the like).

In some embodiments, the contact center system 600 includes a CCS client 660 configured to monitor activities within the contact center and transmit event notifications to the CCS 100. The CCS client 660 is also configured to receive event notifications from the CCS 100 and determine if actions should be taken in response to the notifications. Of course, instead of an independent unit, the functionality of the CCS client 660 may be incorporated into one of the existing servers of the contact center system, such as, for example, the routing server 624, interaction server 65, and/or the like.

In generating events to the CCS, the CCS client 660 monitors interactions of the contact center to determine if there is a change in a customer's journey. In this regard, the CCS client 660 determines if any of the interactions relate to one of the predefined events, which are informed by the CCS 100. The predefined events may, in one example, fall within the three categories of events (i.e., start events, update events, and close events) relating to the entity that is associated with the contact center system 600. The set of predefined events may be maintained in an event management (EM) database 644 hosted in the mass storage device 626 or elsewhere.

Every time a user interaction is detected (e.g., when an end user 10 changes a reservation through an enterprise website hosted by the web servers 620), the CCS client 660 queries the event management database 644 to determine if the interaction matches one of the predefined events. If there is a match, the routing server 624 may send a notification to the CCS 100 over the data communications network 610. The notification may identify the end user 10, the entity associated with (e.g., being supported by) the contact center system 600, the event. In some embodiments, the notification may identify the ID of a specific journey/service record to which the interaction relates.

The CCS client 660 may also receive alerts provided by the communication controller 150 of the CCS 100. The alert may contain information that may indicate that an end user 10 of the contact center system 600 has interacted with an unaffiliated entity in a manner that may impact the trusted entity 200 associated with (e.g., supported by) the contact center system 600. When an alert is received, the CCS client 660 analyzes the alert for determine whether actions are to be taken in response to the alerts In some embodiments, upon receiving the alert from the CCS 100, the CCS client 660 queries a rules engine 633 storing rules for the contact center in selecting an action to be taken in processing the alert. The rules engine 633 is configured to apply one or more business rules based on input event data, and to provide a response from the contact center system 600 (on behalf of the associated trusted entity 200) to the end user 10 identified in the alert. According to one embodiment, the selected action generates a workitem to be routed to an automated system or contact center agent of the contact center system. The workitem may generate an outbound communication, such as, for example, an email, text, or telephony call, to the end user. The workitem may also be other tasks to be handled by a contact center agent, such as, for example, researching hotel room availability in the event of a rescheduled flight, proactively contacting the customer of the hotel room availability, and making a change to the customer's hotel reservation. According to one embodiment, the workitem, once generated by the CCS client 660, is transmitted to the interaction server 656 for routing to the appropriate contact center resource.

In some examples, if the input event is classified as an open event, the rules may specify that an automated message (e.g., an email or text message) be sent to the end user to promote one or more of the trusted entity's products or services that may be related to the input event. For instance, if the input event identifies a reservation for a flight to a destination, the rules may specify sending an automated email/text message offering a discount on hotel or car rental reservations at the destination. Further, if the input event is classified as an update event, the rules may call for an agent of the contact center system 600 to reach out (by telephone, email, etc.) to the end user 10 to determine if the end user 10 also wishes to update an open service with the trusted entity 200 associated with the contact center system 600.

As will be understood by a person of ordinary skill in the art, the above-mentioned rules are only provided as examples, and the rules engine 633 may specify any business rules that are suitable for the supported trusted entity 200.

As described above with reference to FIGS. 1-6, the cross-entity communication system, according to some embodiments of the present invention, enables intelligent cross-entity communication of information relating to commercial user activity among a group of unaffiliated entities (e.g., a group of unaffiliated businesses) that is trusted by a user. The unaffiliated entities do not exchange user interaction information directly, and information that is needed to improve the user's overall experience in interacting with the trusted entities is shared through the cross-entity communication system if the trusted entities are predicted to be impacted by a particular user interaction. For instance, the identity of an entity that is the source of information being shared remains hidden from the other trusted entities. As such, the cross-entity communication system allows the group of trusted entities to share critical information anonymously.

Accordingly, the cross-entity communication system improves user engagement by entities, reduces user involvement in obtaining proper service, and improves customer satisfaction while protecting the user's data privacy and security. In addition, the dissemination of event information is selectively and intelligently conducted based on prediction of whether an entity is to be impacted by a particular user interaction with another unaffiliated entity.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g., WebRTC calls), and the like.

As described herein, various applications and aspects of the present invention may be implemented in software, firmware, hardware, and combinations thereof. When implemented in software, the software may operate on a general purpose computing device such as a server, a desktop computer, a tablet computer, a smartphone, personal digital assistant, or an embedded system such as a computer system embedded in a device to create an Internet-of-things (IoT) device. Such a general purpose computer includes a general purpose processor and memory.

Each of the various servers, controllers, switches, gateways, engines, and/or modules (collectively referred to as servers) in the afore-described figures may be a process or thread, running on one or more processors, in one or more computing devices 1500 (e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JavaScript Object Notation (JSON).

Figure 7A:
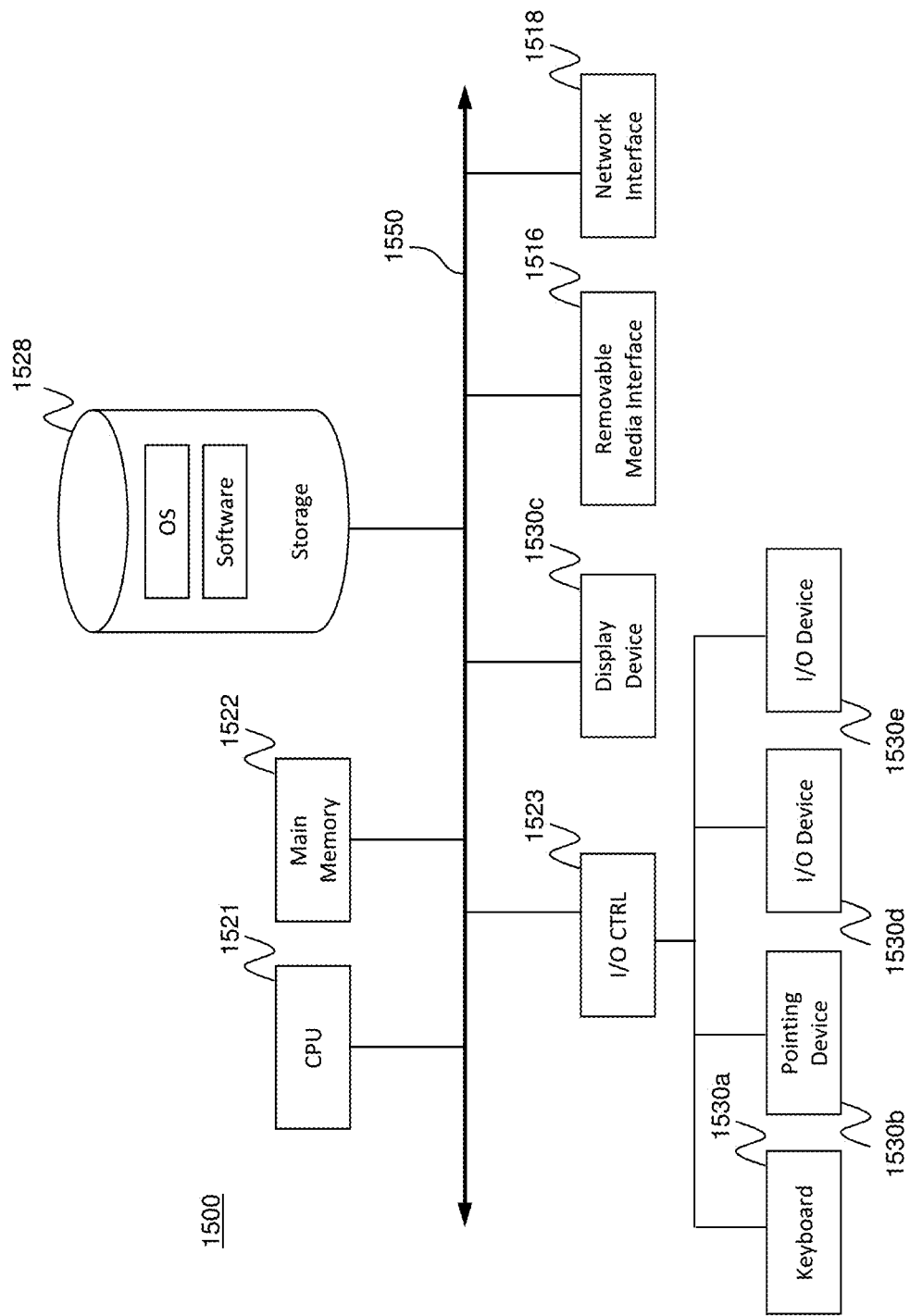
FIGS. 7A-7D are block diagrams of a computing device, according to some exemplary embodiments of the present invention.
Figure 7B:
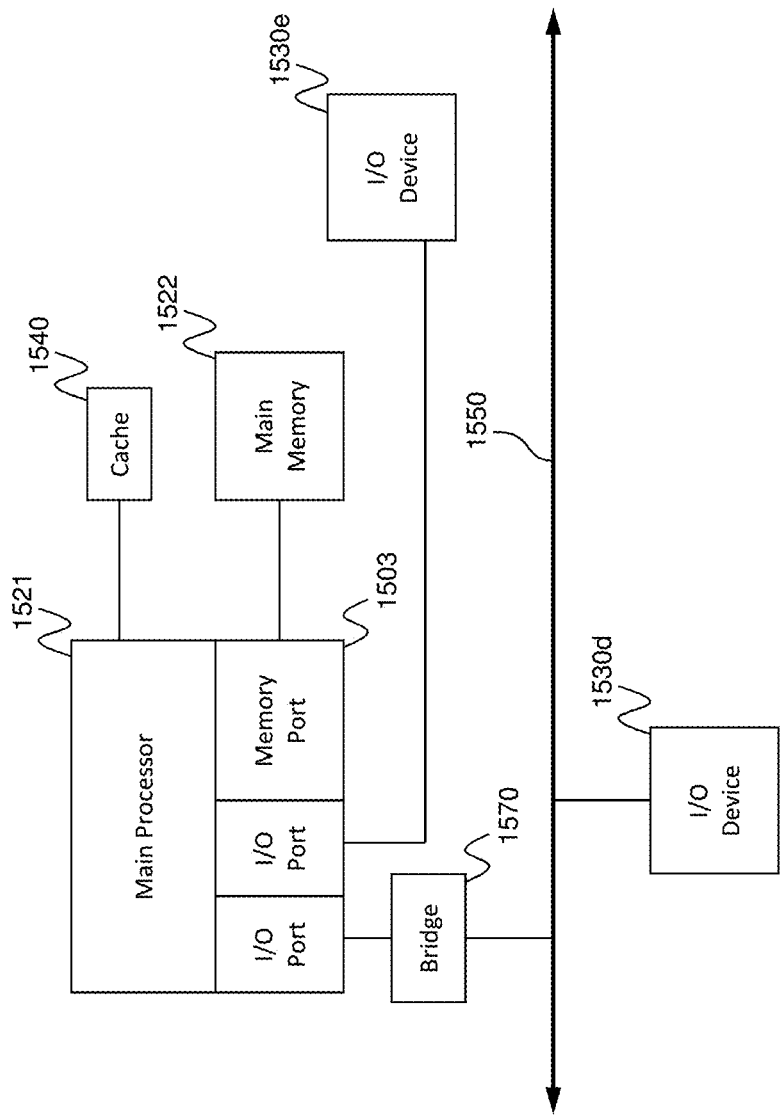

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530a and a pointing device 1530b, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530c, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may include multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 7D:
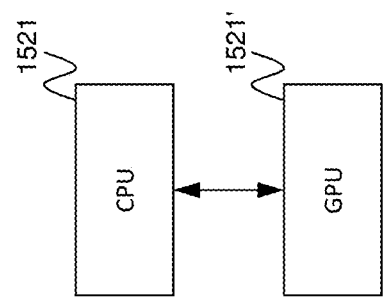
Figure 7C:
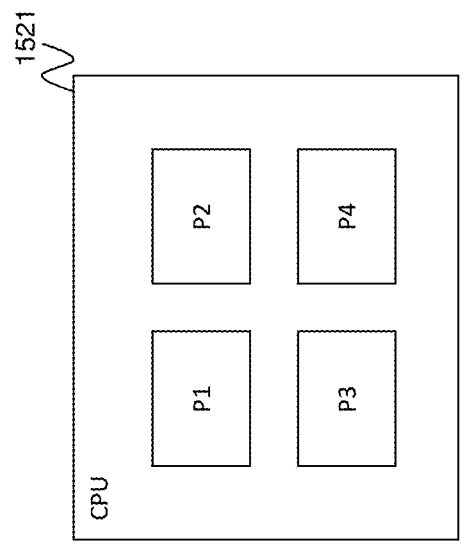

As shown in FIG. 7C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
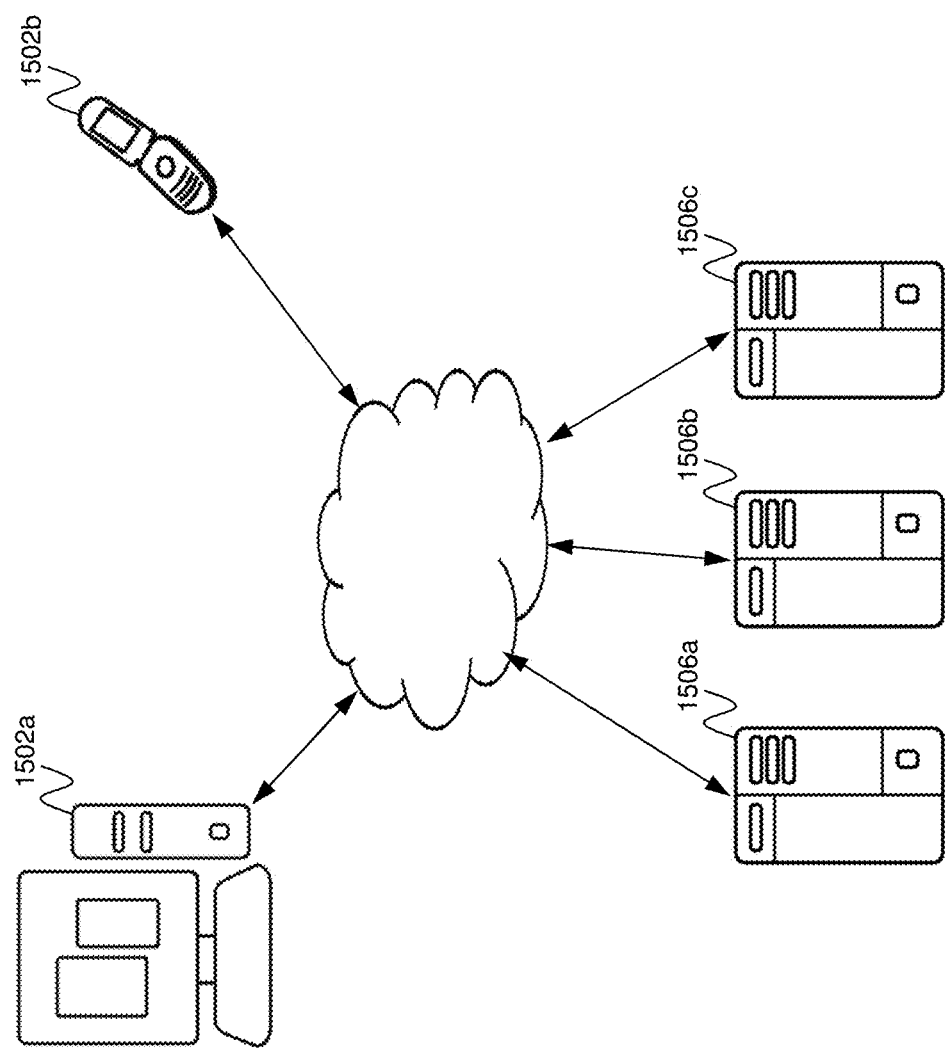
FIG. 7E is a block diagram of a network environment including several computing devices, according to some exemplary embodiments of the present invention.

A computing device may be one of a plurality of machines connected by a network, or it may include a plurality of machines so connected. FIG. 7E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of establishing communication across contact center systems of unaffiliated entities based on machine learning, the method comprising:
receiving, by the processor, identification of first and second entities of the unaffiliated entities selected by a user via a graphical user interface, the selection of the first and second entities being indicative of trust of the first and second entities by the user;
storing, by the processor, identification of the first and second entities in a list in association with the user;
receiving, by the processor, a first signal from a first server of a first one of the contact center systems associated with the first entity, the first signal being received from the first server over a wide area network, the first signal including data of a first interaction between the user and the first entity, wherein the first interaction is conducted over a first interface provided by the first entity;
generating, by the processor, a first record in response to the first signal;
receiving, by the processor, a second signal from a second server of a second one of the contact center systems associated with the second entity, the second signal being received from the second server over the wide area network, the second signal including data of a second interaction between the user and the second entity, wherein the second interaction is conducted over a second interface provided by the second entity;
generating, by the processor, a second record in response to the second signal;
receiving, by the processor, a third signal from the first server over the wide area network, the third signal being indicative of an event associated with the first interaction between the user and the first entity;
in response to receipt of the third signal:
identifying, by the processor, the user based on an identifier embedded within the third signal;
updating, by the processor, the first record based on the event;
retrieving, by the processor, the list of the plurality of entities stored in association with the user;
identifying, by the processor, the second entity from the list;
predicting, by the processor, based on machine learning, impact of the event on the second entity;
determining, by the processor, based on the machine learning, that the second entity is predicted to be impacted by the event;
identifying, by the processor, the second record generated for the second entity; and
in response to the determining of the impact and the identification of the second record, generating, by the processor, a fourth signal and transmitting the fourth signal to the second server over the wide area network, the fourth signal comprising data corresponding to the user and the event.

2. The method of claim 1, wherein the method further comprises:
identifying the event as an update event, wherein the updating of the first record is based on the identifying of the event as an update event.

3. The method of claim 1, wherein the identifying the second entity further comprises:
identifying, by the processor, the second record as an open service record associating the second entity and the user with the second interaction.

4. The method of claim 1, wherein the second entity is predicted to be impacted within a threshold level of confidence.

5. The method of claim 1, wherein the event is one among a plurality of predetermined events associated with the first one of the contact center systems.

6. The method of claim 1, wherein in transmitting the fourth signal to the second entity, identity of the first entity is kept anonymous to the second entity.

7. The method of claim 1, wherein the first and second signals each include an open event, wherein the first and second records are generated respectively in response to the first and second signals including the open event.

8. A method of establishing communication across contact center systems of unaffiliated entities based on machine learning, the method comprising:
receiving, by the processor, a first signal from a first server of a first one of the contact center systems, the first signal being indicative of an event associated with a first entity of the unaffiliated entities;
identifying, by the processor, a user based on an identifier embedded within the first signal;
identifying, by the processor, one or more second entities from among the unaffiliated entities, wherein the second entities are identified as being trusted by the user;
predicting, by the processor, impact of the event on the one or more second entities, wherein the predicting of the impact includes:
maintaining, by the processor, a model for each particular industry vertical of a plurality of industry verticals, each of the models modeling a correlation of a plurality of first events associated with the particular industry vertical to other ones of the plurality of industry verticals;
identifying, by the processor, the particular industry vertical associated with the first entity associated with the event;
retrieving, by the processor, the model for the identified particular industry vertical;
providing, by the processor, information on the event to the retrieved model;
receiving, by the processor, identification of one or more second industry verticals correlated to the event; and
determining, by the processor, whether the one or more second entities are associated with the one or more second industry verticals;
identifying, by the processor, a particular entity from among the one or more second entities predicted to be impacted by the event; and
generating, by the processor, a second signal for transmission to a second server of a second one of the contact center systems associated with the identified particular entity, the second signal comprising data corresponding to the user and the event.

9. The method of claim 8, further comprising:
monitoring, by the processor, a second event generated by the identified particular entity, the identified particular entity being associated with the one or more second industry verticals; and
updating, by the processor, a corresponding model for the identified particular industry vertical based on the second event.

10. A cross-entity communication system for establishing communication across contact center systems of unaffiliated entities, the cross-entity communication system being external to the contact center systems of the unaffiliated entities, the system comprising:
- a processor; and
- memory storing instructions that, when executed on the processor, cause the processor to perform:
  - receiving identification of first and second entities of the unaffiliated entities selected by a user via a graphical user interface, the selection of the first and second entities being indicative of trust of the first and second entities by the user;
  - storing identification of the first and second entities in a list in association with the user;
  - receiving a first signal from a first server of a first one of the contact center systems associated with the first entity, the first signal being configured to be received from the first server over a wide area network, the first signal including data of a first interaction between the user and the first entity, wherein the first interaction is configured to be conducted over a first interface provided by the first entity;
  - generating a first record in response to the first signal;
  - receiving a second signal from a second server of a second one of the contact center systems associated with the second entity, the second signal being configured to be received from the second server over the wide area network, the second signal including data of a second interaction between the user and the second entity, wherein the second interaction is configured to be conducted over a second interface provided by the second entity;
  - generating a second record in response to the second signal;
  - receiving a third signal from the first server over the wide area network, the third signal being indicative of an event associated with the first interaction between the user and the first entity;
  - in response to receipt of the third signal:
    - identifying the user based on an identifier embedded within the third signal;
    - updating the first record based on the event;
    - retrieving the list of the plurality of entities stored in association with the user:
    - identifying the second entity from the list;
    - predicting, based on machine learning, impact of the event on the second entity;
    - determining, based on the machine learning, that the second entity is predicted to be impacted by the event;
    - identifying the second record generated for the second entity; and
    - in response to the determining of the impact and the identification of the second record, generating a fourth signal and transmitting the fourth signal to the second server over the wide area network, the fourth signal comprising data corresponding to the user and the event.

11. The system of claim 10, wherein the identifying of the particular entity further comprises:
- identifying the second record as an open service record associating the second entity and the user with the second interaction.

12. The system of claim 10, wherein the second entity is predicted to be impacted within a threshold level of confidence.

13. The system of claim 10, wherein the event is one among a plurality of predetermined events associated with the first one of the contact center systems.

14. The system of claim 10, wherein the instructions that cause the processor to transmit the fourth signal to the second entity, include instructions that cause the processor to keep identity of the first entity anonymous to the second entity.

15. The system of claim 10, wherein the first and second signals each include an open event, wherein the first and second records are configured to be generated respectively in response to the first and second signals including the open event.

16. A cross-entity communication system for establishing communication across contact center systems of unaffiliated entities, the cross-entity communication system being external to the contact center systems of the unaffiliated entities, the system comprising:
- a processor; and
- memory storing instructions that, when executed on the processor, cause the processor to perform:
  - receiving a first signal from a first server of a first one of the contact center systems, the first signal being indicative of an event associated with a first entity of the unaffiliated entities;
  - identifying a user based on an identifier embedded within the first signal;
  - identifying one or more second entities from among the unaffiliated entities, wherein the second entities are identified as being trusted by the user;
  - predicting impact of the event on the one or more second entities, wherein the instructions that cause the processor to predict include instructions that cause the processor to perform:
    - maintaining a model for each particular industry vertical of a plurality of industry verticals, each of the models modeling a correlation of a plurality of first events associated with the particular industry vertical to other ones of the plurality of industry verticals;
    - identifying the particular industry vertical associated with the first entity associated with the event;
    - retrieving the model for the identified particular industry vertical;
    - providing information on the event to the retrieved model;
    - receiving identification of one or more second industry verticals correlated to the event; and
    - determining whether the one or more second entities are associated with the one or more second industry verticals;
  - identifying a particular entity from among the one or more second entities predicted to be impacted by the event; and
  - generating a second signal for transmission to a second server of a second one of the contact center systems associated with the identified particular entity, the second signal comprising data corresponding to the user and the event.

17. The system of claim 16, wherein the instructions further cause the processor to perform:
- monitoring a second event generated by the identified particular entity, the identified particular entity being associated with the one or more second industry verticals; and updating a corresponding model for the identified particular industry vertical based on the second event.

\* \* \* \* \*